United States Patent
Gafford et al.

(10) Patent No.: US 8,660,739 B2
(45) Date of Patent: Feb. 25, 2014

(54) MONITORING THE STATUS OF A VEHICLE

(75) Inventors: Thomas E. Gafford, Fort Worth, TX (US); Manish J. Desai, Houston, TX (US)

(73) Assignees: GPSI, LLC, Pontiac, MI (US); Geometris LP, Houston, TX (US)

( * ) Notice: Subject to any disclaimer, the term of this patent is extended or adjusted under 35 U.S.C. 154(b) by 0 days.

(21) Appl. No.: 13/443,314

(22) Filed: Apr. 10, 2012

(65) Prior Publication Data

US 2012/0200405 A1  Aug. 9, 2012

Related U.S. Application Data

(62) Division of application No. 12/351,070, filed on Jan. 9, 2009.

(51) Int. Cl.
*G06F 7/00* (2006.01)

(52) U.S. Cl.
USPC ............. 701/29.1; 701/36; 340/438; 340/500

(58) Field of Classification Search
None
See application file for complete search history.

(56) References Cited

U.S. PATENT DOCUMENTS

| | | | |
|---|---|---|---|
| 4,492,213 A * | 1/1985 | Yamamoto et al. ............ 123/644 |
| 4,514,694 A * | 4/1985 | Finger ........................... 324/429 |
| 4,734,673 A * | 3/1988 | Murata et al. ................. 340/439 |
| 5,223,844 A | 6/1993 | Mansell et al. |
| 5,418,537 A | 5/1995 | Bird |
| 5,917,423 A | 6/1999 | Duvall |
| 6,025,774 A | 2/2000 | Forbes |
| 6,240,365 B1 | 5/2001 | Bunn |
| 6,249,217 B1 | 6/2001 | Forbes |
| 6,377,210 B1 | 4/2002 | Moore |
| 6,688,270 B2 * | 2/2004 | Hisamoto et al. .......... 123/179.3 |
| 6,799,564 B2 * | 10/2004 | Forster et al. ................. 123/644 |
| 7,071,843 B2 | 7/2006 | Hashida et al. |
| 7,319,378 B1 | 1/2008 | Thompson et al. |
| 7,772,806 B2 * | 8/2010 | Kitanaka ....................... 320/140 |
| 2007/0185728 A1 | 8/2007 | Schwarz et al. |
| 2010/0179897 A1 | 7/2010 | Gafford |

FOREIGN PATENT DOCUMENTS

FR  2914961 A1 * 10/2008

* cited by examiner

*Primary Examiner* — Luna Champagne
(74) *Attorney, Agent, or Firm* — John S. Paniaguas; Katten Muchin & Rosenman LLP

(57) ABSTRACT

An asset tracking system for tracking assets, for example, a vehicle, with an integrated topology that is configured minimize the complexity of the system by eliminating hardware duplication and sensing the ignition state while obviating the need to access the ignition switch circuit; the asset tracking system optionally including a loan obligation management system that is integrated with the asset recovery system which provides in-vehicle notifications of loan obligations for the asset upon which the loan obligation is based from a remote location directly to the asset.

7 Claims, 15 Drawing Sheets

Typical Telematics System

- Application Subsystem
- Communications Subsystem
  - Cellular
  - Satellite
  - Short Range RF
- GPS Subsystem
- Power & IO

Typical Telematics System
- ## GPS Subsystem

MONITORING THE STATUS OF A VEHICLE

CROSS REFERENCE TO RELATED APPLICATIONS

This application is a divisional of copending and commonly U.S. patent application Ser. No. 12/351,070, filed on Jan. 9, 2009.

BACKGROUND OF THE INVENTION

1. Field of the Invention

The present invention relates to an asset tracking system for tracking assets, for example, a vehicle, with an integrated topology that is configured minimize the complexity of the system by eliminating hardware duplication and sensing the ignition state of the vehicle which obviates the need to access the vehicle ignition switch circuit; the asset tracking system optionally including a loan obligation management system that is integrated with the asset recovery system which provides notifications of loan obligations for the asset upon which the loan obligation is based and can even disable the vehicle from a remote location.

2. Description of the Prior Art

Various asset tracking systems are known in the art. Such asset tracking systems are typically used to track vehicles. Examples of such asset recovery systems that are used to track vehicles are disclosed in U.S. Pat. Nos. 5,223,844; 5,418,537; 6,025,774; 6,240,365; 6,249,217; and 6,377,210, all hereby incorporated by reference. In addition OnStar[1] in-vehicle security, communications, and diagnostics systems and LoJack[2] vehicle recovery systems are also known which can locate and track the position of a vehicle and facilitate recovery of stolen vehicles.

[1] OnStar is a registered trademark of General Motors Corporation
[2] LoJack is a registered trademark of LoJack Corporation In general, such asset recovery systems 20 are generally configured as illustrated in FIG. 1 normally include four (4) relatively autonomous subsystems. The four (4) subsystems consist of an application subsystem 22, a communications subsystem 24, a global positioning system (GPS) subsystem 26 and a power and input/output (I/O) subsystem 28. One problem with known vehicle recovery systems relates to the level of duplication of hardware components among the subsystems 22, 24, 26 and 28. Such duplication increases the complexity and cost of such vehicle recovery systems as well as the size of the device.

More particularly, a block diagram of the Application Subsystem 22 is illustrated in FIG. 2. As shown, the Application Subsystem 22 includes a CPU (computer processing unit) 30, peripherals 32, random access memory (RAM), flash memory 36 for storing the main software application 40 and power source 38.

A block diagram of the GPS subsystem 26 is illustrated in FIG. 3. The GPS Subsystem 26 includes another CPU 42, peripherals 44, GPS Correlators 46, RAM 48, Flash Memory 50, Communications hardware 52 for communicating the GPS information to the Communications Subsystem 24, a GPS Antenna 52, a GPS RF Receiver 54 for receiving position information from GPS satellites (not shown), and LDO Regulators 56.

A low drop out (LDO) regulator is a linear voltage regulator that operates even when the input voltage barely exceeds the desired output voltage. Such LDO regulators are known to be used with systems that are driven by battery power sources, such as a vehicle.

FIG. 4 is a block diagram of the Communications Subsystem 24. The Communications Subsystem 24 includes a CPU 58, peripherals 60, a power amplifier 62, RAM 64, and Flash Memory 66, Communications hardware 68 for communicating with the GPS Subsystem 26, an antenna 70, an RF Transceiver 72 and LDO Regulators 74.

FIG. 5 illustrates a block diagram of the Power and I/O Subsystem 28. The Power and I/O Subsystem 28 includes power regulators 76, battery charger 80, ESD (Electrostatic discharge) and Surge Protection 84. The Power and I/O Subsystem 28 also includes software configured as I/O drivers 78, battery charge protection 82 and over-current protection 86 that is stored in the Application Subsystem Flash memory 36 (FIG. 2).

FIG. 6 illustrates the duplicated hardware and duplicated functionality that exists among the application subsystem 22, the communications subsystem 24, the GPS subsystem 26 and a power and I/O subsystem 28 in known asset tracking systems. In particular, the duplicated hardware and functionality includes:

Duplicated CPUs: The application subsystem 22, the GPS subsystem 26 and the communications subsystem 24 each have a single purpose CPU.

Duplicated Memory: The application subsystem 22, the GPS subsystem 26 and the communications subsystem 24 all have their own RAM and Flash memory devices for autonomous operation.

Duplicated Communication: The application subsystem 22, the GPS subsystem 26 and the communications subsystem 24 each have communication peripherals for state and data communication among them.

Duplicated Power Components: Multiple LDOs and regulators are required for autonomous power control.

There are other problems associated with known asset recovery systems. For example, such asset recovery systems need the operational state of the ignition system to operate properly. In some vehicles, such as motorcycles, scooters, all terrain vehicles, and watercraft, access to the vehicle ignition system is either unavailable or inaccessible. As such, asset recovery systems are generally unavailable for such vehicles. Another problem with known asset recovery systems is a lack of optimization of system resources, for example, for loan obligation management.

Thus, there is a need to simplify such asset recovery systems which minimizes the complexity of the system and minimizes duplication of hardware components to reduce the cost of such systems and obviates the need to access the ignition circuit in order to make such asset recovery systems available for vehicles with inaccessible vehicle ignition systems and provide remote management of the asset with respect to its loan obligation.

SUMMARY OF THE INVENTION

The present invention relates to an asset tracking system for tracking assets, for example, a vehicle, with an integrated topology that is configured minimize the complexity of the system by eliminating hardware duplication and sensing the ignition state of the vehicle while obviating the need to access the ignition switch circuit; the asset tracking system optionally including a loan obligation management system that is integrated with the asset recovery system which provides audible notifications of loan obligations for the asset upon which the loan obligation is based and can even disable the vehicle from a remote location.

DESCRIPTION OF THE DRAWING

These and other advantages of the present invention will be readily understood with reference to the following specification and attached drawing wherein.

DETAILED DESCRIPTION

The present invention relates to an asset tracking system for tracking assets, for example, a vehicle, with an integrated topology that is configured minimize the complexity of the system by eliminating hardware duplication and sensing the ignition state of the vehicle with two (2) wires over one or more sample periods that obviates the need to access the vehicle ignition switch circuit. FIGS. 7-13 illustrate the integrated asset recovery system in accordance with the present invention. FIG. 14 illustrates an optional loan obligation management system for use with the asset recovery system in accordance with another aspect of the invention.

The asset recovery system in accordance with the invention reduces complexity relative to known asset recovery systems in several ways by:
- Consolidating all subsystem CPU requirements.
- Eliminating all subsystem intercommunication connections.
- Consolidating all Flash and RAM memory requirements.
- Consolidating power rails, switches, regulators and monitors.

Exemplary Hardware

Figure 1:
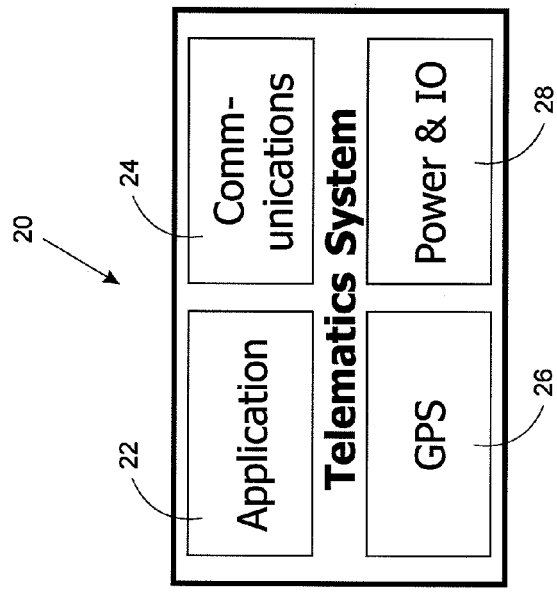
FIG. 1 is a high level block diagram of a known asset recovery system.
Figure 2:
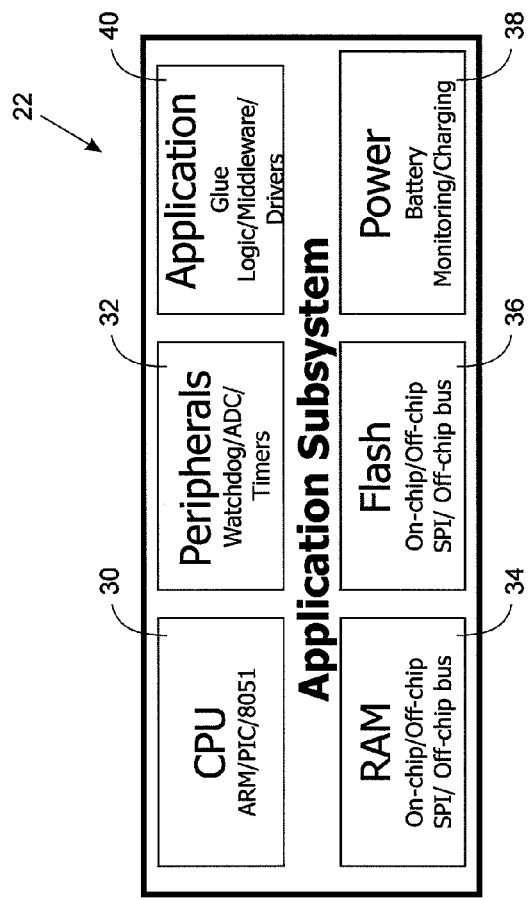
FIG. 2 is a block diagram of a known application subsystem that forms a part of the asset recovery system illustrated in FIG. 1.
Figure 3:
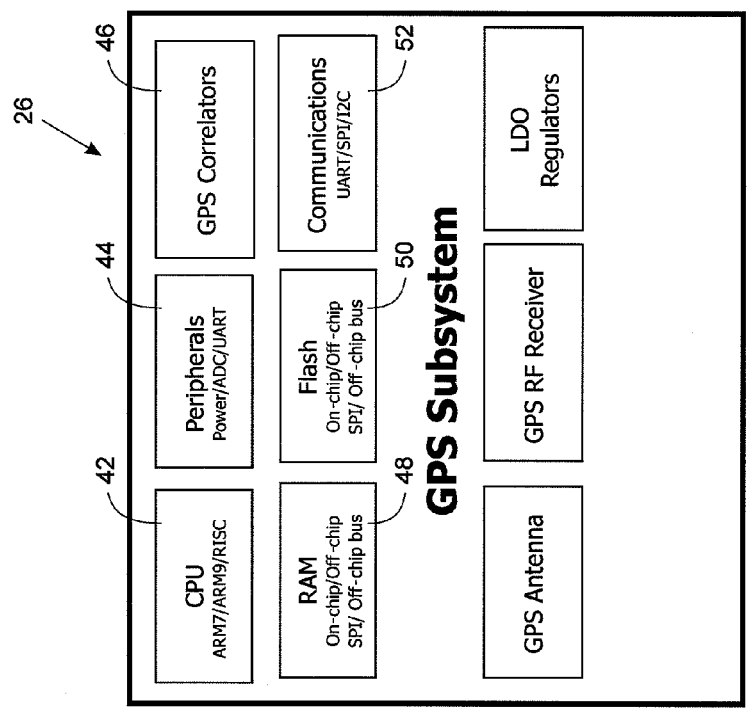
FIG. 3 is a block diagram of a known GPS subsystem that forms a part of the asset recovery system illustrated in FIG. 1.
Figure 4:
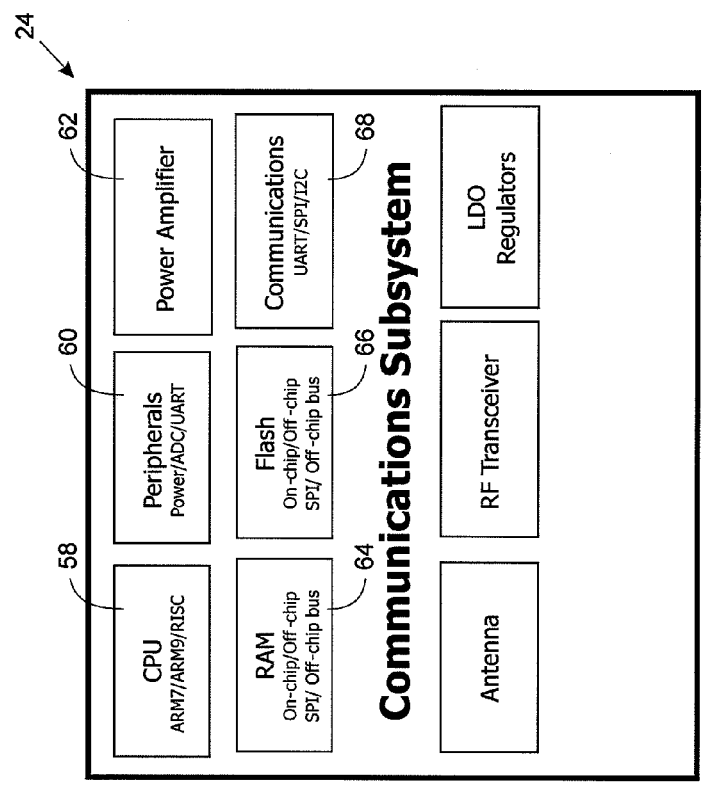
FIG. 4 is a block diagram of a known communication subsystem that forms a part of the asset recovery system illustrated in FIG. 1.
Figure 5:
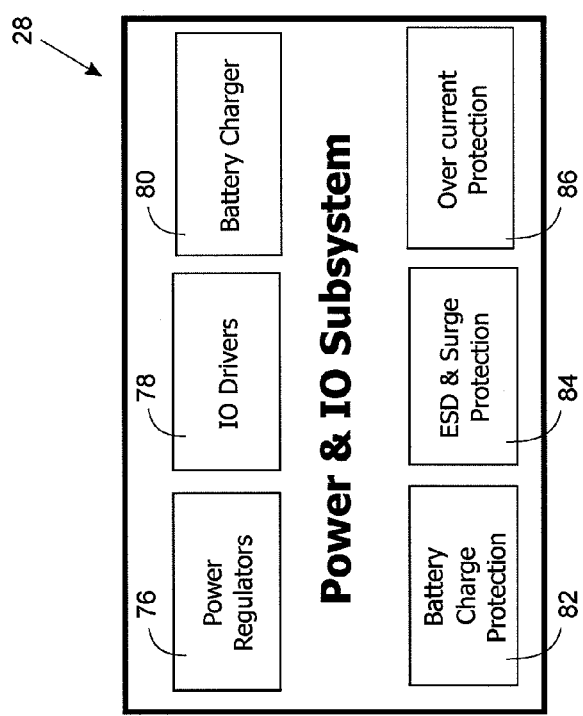
FIG. 5 is a block diagram of a known power and I/O subsystem that forms a part of the asset recovery system illustrated in FIG. 1.
Figure 6:
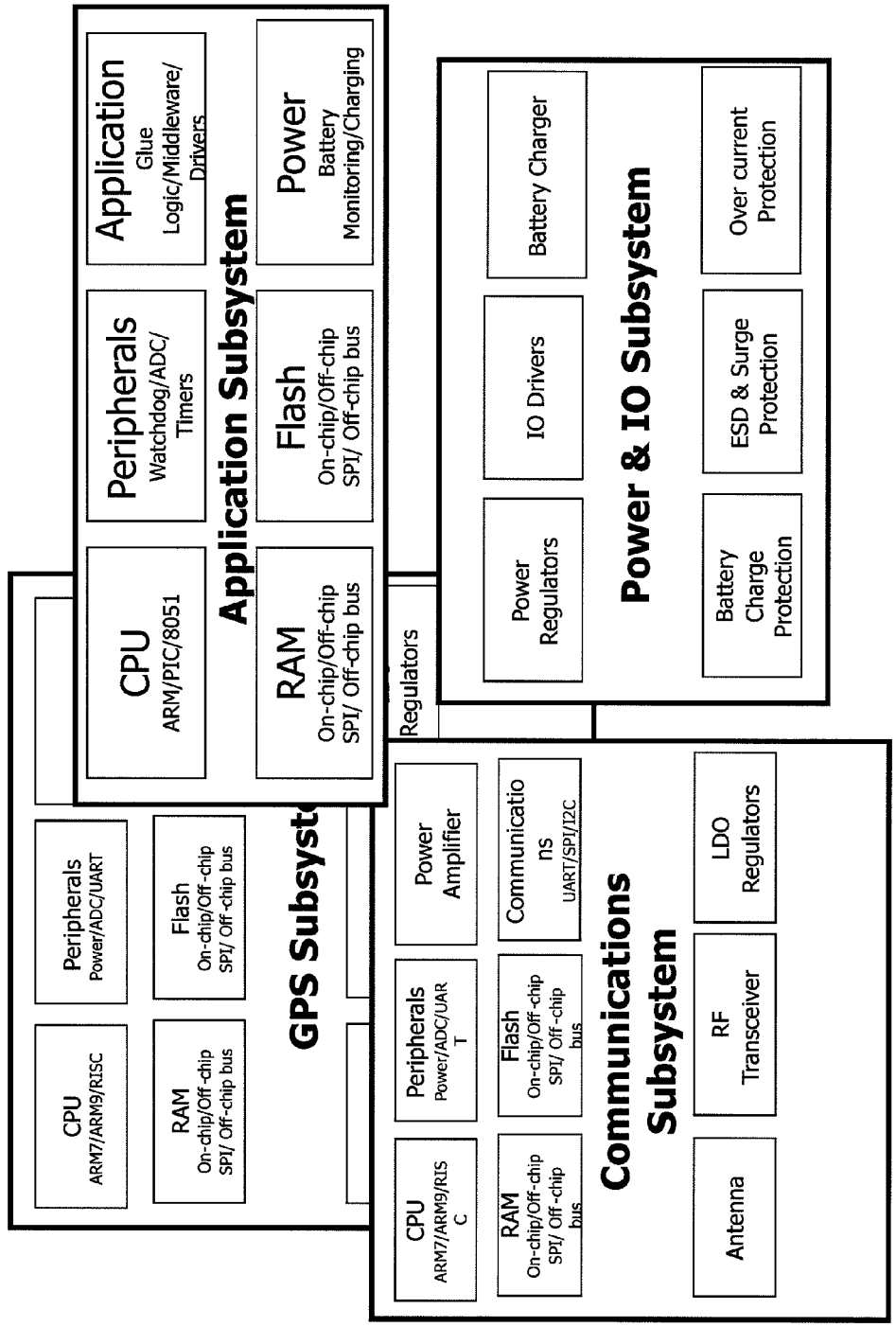
FIG. 6 illustrates the overlap of the hardware components of the asset recovery system illustrated in FIG. 1.
Figure 7:
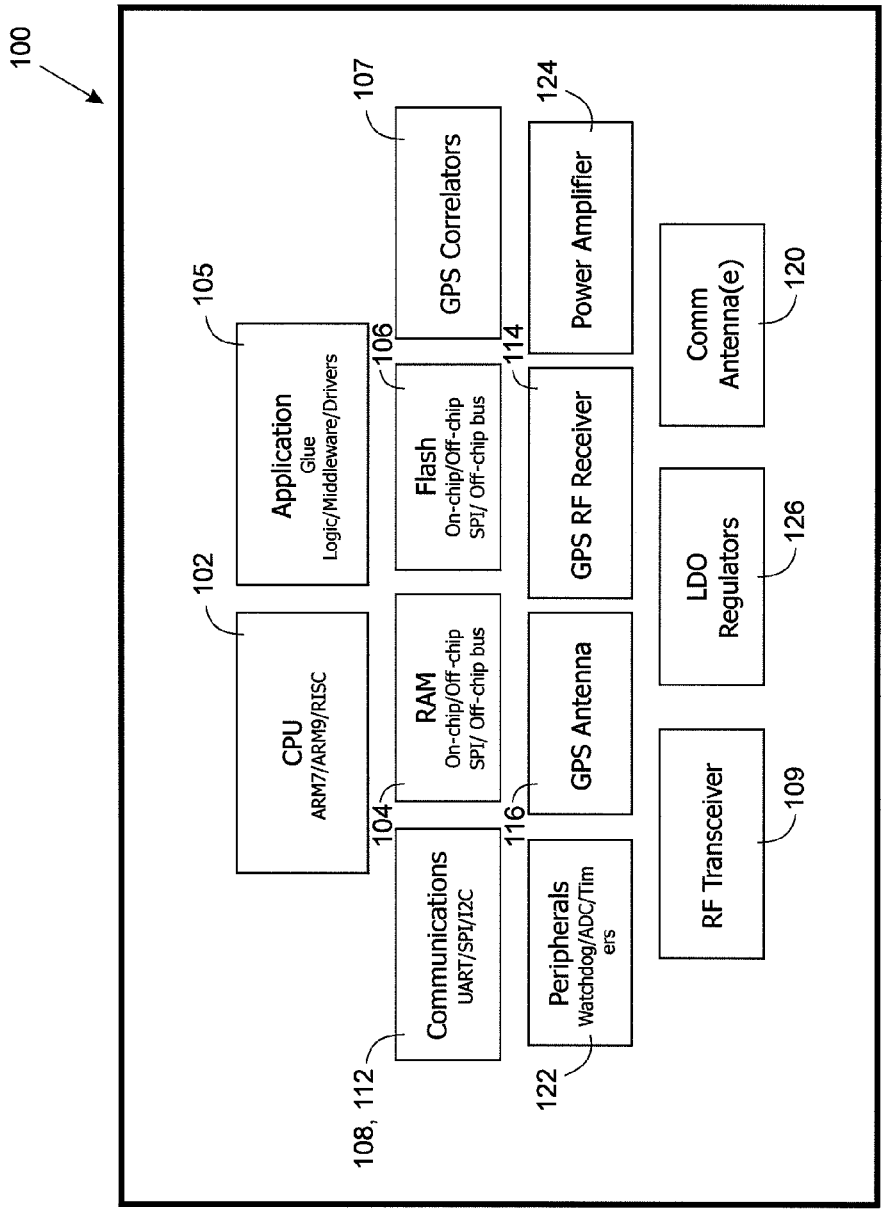
FIG. 7 is a block diagram of the integrated asset recovery system in accordance with the present invention.

Referring to FIG. 1, a block diagram of the asset recovery system in accordance with the present invention is illustrated and identified with the reference numeral 100. The asset recovery system 100 includes a single CPU 102, for example, a Reduced Instruction Set Computer (RISC), Model ARM7 or ARM9, CPU. As mentioned above, the memory is consolidated with a single RAM memory 104 and a single Flash memory 106. As such, the software applications, such as the main Application 105 and the GPS Correlators 107, on the same memory device, namely, the Flash memory 106. As far as communications ports, ports for inter-communication between different subsystems have been eliminated. With the integrated system in accordance with the present invention, only two (2) communication ports are necessary. A Simple Sensor Interface (SSI) 108 is required for interfacing an RF transceiver 109, which forms part of a cellular subsystem, generally identified with the reference numeral 110 (FIG. 8) with the CPU 102 (FIG. 7). The SSI port 108 may be on-board the CPU 102. The cellular subsystem also includes a cellular antenna 120 for receiving and transmitting data between the asset recovery system 100 and a remote device (not shown). The SSI protocol is a simple communications protocol designed for data transfer between computers or user terminals and smart sensors. Another port, a universal asynchronous receiver/transmitter (UART) 112 is used to interface a GPS receiver 114 with the CPU 102. The UART 112 may be on board the CPU 102. The GPS receiver 114 and a GPS antenna 116 form a GPS subsystem, generally identified with the reference numeral 118. Since only a single CPU 102 is required, the number of associated CPU peripherals is reduced. For example, only a single peripheral 122 is required which includes peripheral devices and applications, such as an analog to digital converter (ADC) and a watchdog timer. The integrated asset recovery system 100 also minimizes the power supply requirements of the system and only requires a single power amplifier 124 and a single LDO regulator 126.

Figure 8A:
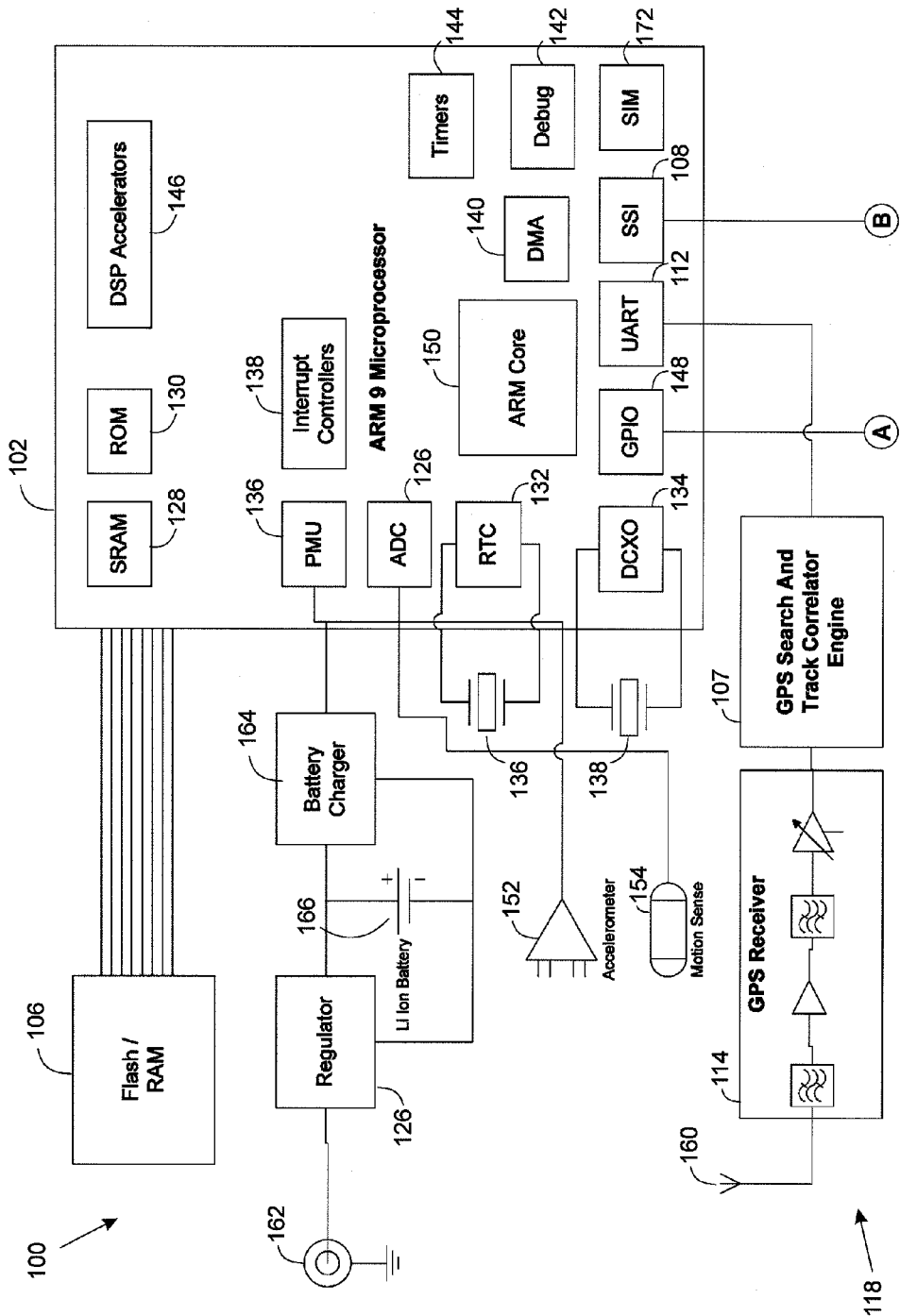
FIG. 8 is a schematic diagram of the integrated asset in accordance with the present invention.
Figure 8B:
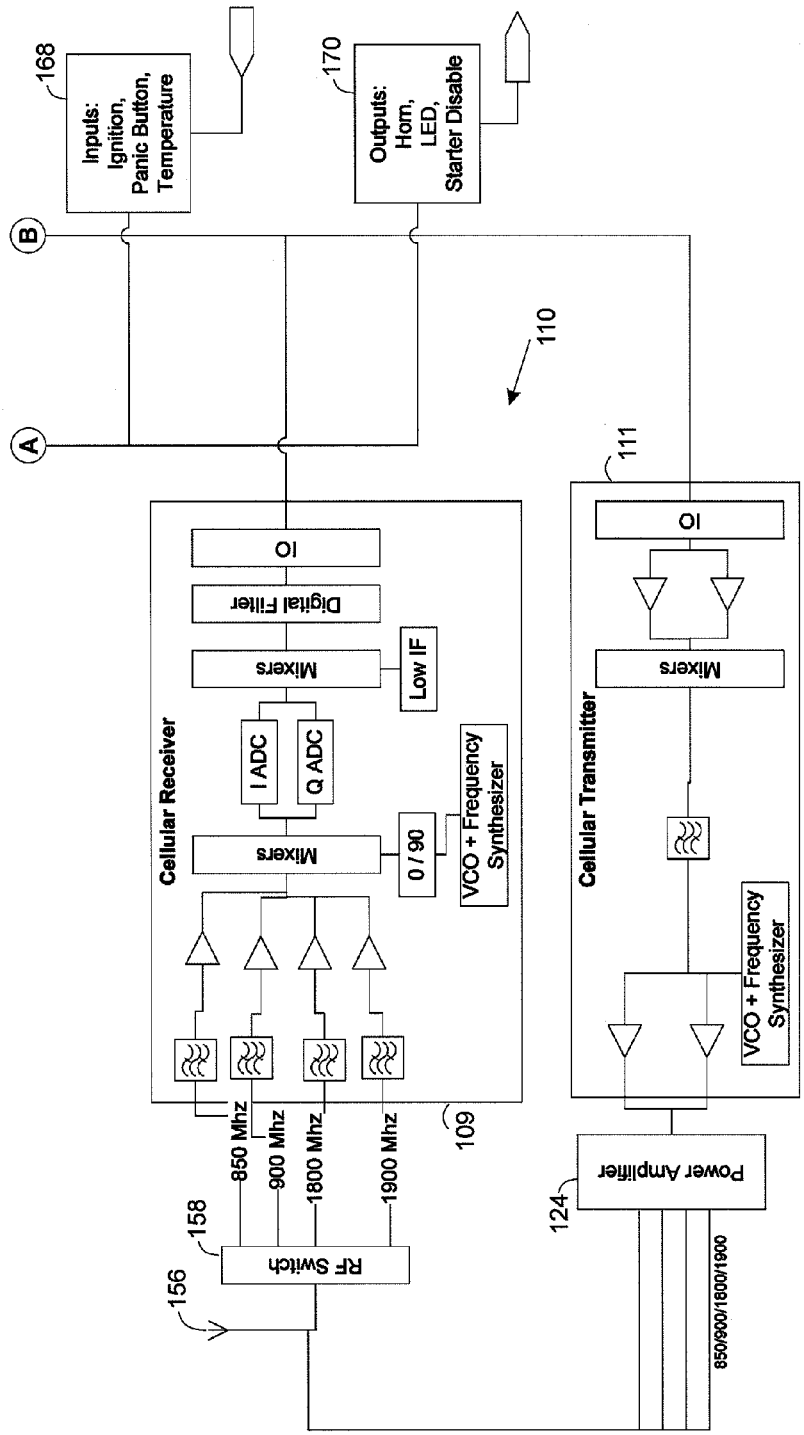

A schematic of the asset recovery system 100 is illustrated in FIG. 8. An important aspect of the invention relates to the consolidation of hardware components, such as the CPU. In particular, a single CPU 102 is used to control the entire asset recovery system 100. The CPU 102 may be a RISC processor, for example, an ARM 9 RISC processor, or may be a Model WMP100 wireless microprocessor, chip set, as manufactured by WaveCom SA. As mentioned above, the CPU 102 may include on-board UART 112 and SSI 108 ports for interfacing the GPS Subsystem 118 and the cellular subsystem 110, respectively, with the CPU 112. The CPU 102 may also have on-board ADC 126, as well as on-board static RAM 128 and ROM 130. The CPU 102 may also have an on-board real time clock (RTC) 132 and a digitally controlled crystal oscillator (DCXO) 134, controlled by external crystals 136 and 138, respectively. The crystal 136 is used to generate the clock speed of the CPU 102. The crystal 138 is used for development of a real time clock signal. The CPU 102 may also include a power management unit (PMU) 136, an interrupt controller 138, a direct memory access (DMA) controller 140, internal debug software 142, internal timers 144, a digital signal processor (DSP) accelerator 146, general purpose input/output ports GPIO 148 in addition to the core processor, identified with the reference numeral 150.

The asset recover system 100 may include various motion inputs from motion devices that are used to control the power management of the asset recovery system 100. For example, an accelerometer 152 may couple to the power management unit (PMU) 136, on-board the CPU 102. Thus, while the asset, e.g. a vehicle, is parked, power to the asset recovery system 100 can be reduced and later restored when motion of the asset is detected. An additional motion sensor 154, for example, a vibration sensor, may additionally be used to control the power management of the asset recovery system 100. As shown, the motion sensor 154 is interfaced to the CPU 102 by way of the on-board ADC 126.

One essential aspect of the asset recovery system 100 is the ability to communicate with a remote device. As shown, a cellular subsystem 110 may be used for two way wireless communication between the asset recovery system 100 and a remote device, such as remote base station. Other communication systems, such as RF and satellite communication systems can also be used.

The cellular subsystem 110 includes a cellular receiver 109 and a cellular transmitter 111, which may included as a part of the WMP100, wireless microprocessor chip set, mentioned above. The cellular subsystem 110 may be a multi-band system operable on various cellular frequencies. As shown, a GSM (Global System for Mobile communications) cellular subsystem is illustrated which is operable on four (4) frequency bands: 850 MHz, 900 MHz, 1800 MHz and 1900 MHz. Other multi-band and single band systems are also suitable.

The cellular subsystem 110 also includes a cellular antenna 156 that is coupled to both the cellular receiver 109 and the cellular transmitter for receiving and transmitting data with respect to a remote device. An RF switch 158 is used to interface the cellular antenna to the cellular receiver 109 and allows the various frequency bands to be selected. The RF switch may, for example, may be included as a part of the WMP100, wireless microprocessor chip set, mentioned above The power amplifier 124 is used to boost the signal from the cellular transmitter 111 before it is directed to the cellular antenna. The power amplifier 124 may be, for example, may included as a part of the WMP100, wireless microprocessor, mentioned above Both the cellular transmitter 111 and the cellular receiver 109 are interfaced to the CPU 102 by way of the on-board SSI 108.

The global position system (GPS) subsystem 118 includes a GPS antenna 160 and the GPS receiver 114. The GPS antenna 160 and GPS receiver 114 are configured to receive satellite signals from GPS satellites. The GPS receiver 114, may be, for example, Model GNS-7560 chip set, as manufactured by NXP Semiconductors. The GPS Search and Track Correlator Engine 107 correlates received signals with specific satellites so that the signals can be used to triangulate the position of the asset. GPS Search and Track Correlator Engine 107 is part of the GPS receiver 114. The GPS subsystem is interfaced with the CPU 102 by way of the UART 112, on-board the CPU 102.

Electrical power for the asset recovery system 100 may be derived from the vehicle power system, for example, the 12 volt DC power system. A conventional power connector may be used to connect the asset recover system 100. The vehicle power may be regulated by a voltage regulator 126 and applied to the PMU 136. A battery charger 164 and a lithium ion back up battery 166 are provided. The back-up lithium ion battery 166 provides power to the asset recovery system 100 when the vehicle power supply is unavailable. During conditions when the asset recovery system 100 is in a low power state, as will be discussed in more detail below, the battery charger 164 is used to charge the lithium ion back-up battery 166. During states other than a low power state, the battery charger 164 is configured to enable electrical power from the coaxial cable jack 162 to pass directly to the PMU, on-board the CPU 102.

There are various inputs 168 and outputs 170 to the CPU 102. These inputs and outputs are all interfaces with the CPU 102 by way of the on-board GPIO 148. The inputs to the CPU 102 include a signal from the vehicle ignition wire, which will either be high or low depending on the state of the ignition system. Other inputs may optionally include an input from a panic button and a temperature input. The panic button enables the user to signal the base station in the event of a medical emergency or other emergency situation. An optional temperature input may be used to monitor the temperature of the CPU 102.

The asset recovery system 100 may provide one or more output signals. For example, the system 100 may provide a horn signal that can be used to sound the vehicle horn as well as an LED signal that can be used to illuminate an LED in the vehicle in certain conditions. The asset recovery system 100 may also provide a starter disable signal that can be used to disable the vehicle starter (not shown).

In order for the base station to be able to distinguish the various asset recovery systems in the field, a Subscriber Identity Module (SIM) 172 which securely stores the service-subscriber key used to identify a subscriber of the asset recovery system. The SIM 172 is also used to store user level configuration data and may be used to store loan account data for systems equipped with an optional loan obligation management system.

Vehicle Ignition State Sensing

With the advent of wireless and GPS technology, a variety of asset tracking applications are now possible. Vehicle tracking is a very common asset tracking application whereby the location of the vehicle is determined, recorded, and transmitted to a remote system. In addition to such location tracking, it is further desirable to record and determine other aspects such as the vehicle's utilization rate (% of time in operation) and instantaneous operating state (at rest, moving, idling, marginal operation). It is also desirable to change the operating profile of the asset tracking device based up the instantaneous condition. For example, a vehicle could be tracked more frequently when it is moving or idling than when it is at rest. Or, the asset tracking device might wish to enter a low power consumption mode or even switch itself off in the event that the power supply it is connected to (the vehicle battery) is being depleted. When the vehicle resumes operation, the device can then jump to a more power intensive operation.

In order to provide these additional features, known systems use additional inputs, such as an ignition input, temperature input, vibration sensor input, among others. However, this approach increases the cost and complexity of the installation process. In some vehicles, a signal representative of the state of the ignition system is directly available from the vehicle ignition switch. In such systems, signals representative of the ignition states; "Ignition On"; "Ignition Off" are readily available from the vehicle ignition switch. In other vehicles, an ignition input is not readily available or at all present in some vehicles to facilitate switching between different operating modes. Examples are such vehicles include motorcycles, scooters, all terrain vehicles, and watercraft. As such, asset recovery systems are heretofore not known to be available for such systems.

Another problem with known asset recovery systems is that smaller vehicles and watercraft are typically equipped with small batteries which can be depleted very quickly. Known systems solve this problem by forcing the system into non-operating sleep modes for extended periods with a periodic wake up in which asset tracking related functions are performed. However, entering extended sleep periods in a two-wire installation significantly impedes the ability of the asset tracking device to maintain and provide reliable information related to the instantaneous operating state or even the overall utilization rate.

The asset recovery system 100 in accordance with the present invention overcomes the challenge of two-wire installations by utilizing a dedicated low-power circuit that monitors the voltage of the vehicle battery to provide a signal representative of the instantaneous operating state of the ignition. As is known in the art, the positive rail of the vehicle battery is normally higher when the vehicle ignition is off. For example, in a typical vehicle with a nominal 12 volt battery, the battery voltage is typically 12.5 volts dc when the ignition is OFF and drops down to around 12.0 volts DC when the ignition is ON. Vehicles with other nominal battery voltages experience similar hysteresis of the battery voltage from the ignition OFF state to the ignition ON state. By measuring across the vehicle battery, the status of the ignition system can easily be determined with a two-wire circuit without the need to access the vehicle ignition system. As such vehicles with inaccessible ignition circuits, such as motorcycles, scooters, all terrain vehicles, and watercraft, can now be equipped with an asset recovery systems.

The ignition status information is used to enter and exit various operating modes as well as lower the overall impact of the device on the power supply of the vehicle thereby extending the life of the battery. In these cases, the device continues to operate in a higher power mode.

Exemplary Software Diagrams

FIGS. 9-13 illustrate exemplary software diagrams for the asset recovery system 100, illustrated in FIGS. 1-8. FIG. 14 illustrates an optional loan obligation management system for use with the asset recovery system in accordance with another aspect of the invention.

As mentioned above, different methods are known for detecting the ignition state of a vehicle. In accordance with one embodiment of the invention, one asset recovery system 100 can be utilized for both the hard-wired system, i.e. hard-wired to the ignition switch (not shown) and a system in which the ignition state is automatically determined by periodically sampling the voltage across the primary winding of the ignition coil. In accordance with an important aspect of the invention, the asset recovery system 1001 automatically detects which installation type was used on the vehicle.

For vehicles in which access to the ignition switch (not shown) is available, the ignition switch, generally identified with the reference numeral 168 (FIG. 8), is coupled to a GP I/O port 148. As is known in the art, vehicle ignition switches have two (2) operating states: "Ignition On" and "Ignition Off". As such, with vehicles with access to the vehicle ignition system, the ignition states are readily available. In other vehicles, as mentioned above, in which the vehicle ignition circuit is inaccessible, the voltage applied to the ignition coil is monitored and used to provide a signal representative of the ignition state.

In order to simplify the installation, a two (2) wire installation is used for both ignition state installation types. For vehicles with access to the vehicle ignition circuit, the two (2) wires are connected to the ignition switch. For vehicles with no access to the vehicle ignition switch circuit, the two (2) wires are connected across the vehicle battery. In order to further the complexity of the installation process, only two (2) wires are provided for external connection. Depending on the accessibility of the ignition circuit, the two (2) wires used to detect the ignition state can be connected to either the ignition switch or the vehicle battery. In accordance with an important aspect of the invention, the asset recovery system 100 automatically determines the installation type. By providing only two (2) wires for external connection, the possibility of incorrect connections is eliminated.

Figure 9:
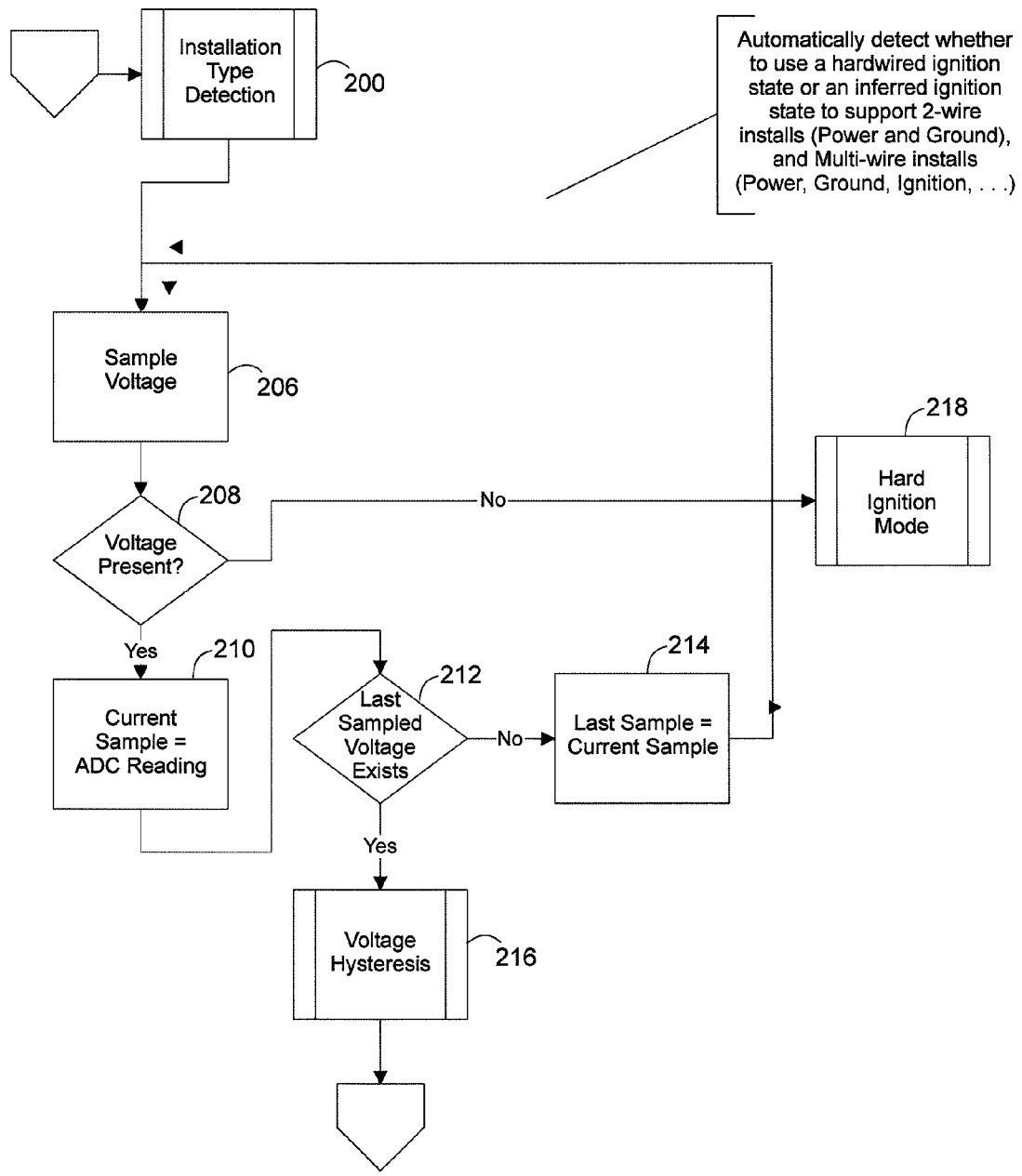
FIG. 9 is a software flow diagram for determining the whether to use a hard-wired ignition state or an "inferred" ignition state.

Referring to FIG. 9, the system automatically detects whether the two (2) wires are connected to an ignition switch or across the vehicle battery. This part of the system, identified with the reference numeral 200, has two (2) operating modes: a hardwire ignition mode and a voltage hysteresis mode. The system samples the voltage available across the battery; for example, by way of a GP I/O port 148 over a plurality of consecutive sample periods. If a voltage is sensed over two (2) sample periods, the system assumes a voltage hysteresis mode and sets a voltage hysteresis flag. In hard-wired installations, a voltage is not available on the GP I/O port 148 (FIG. 8) for two consecutive sample periods. In such applications, a hard ignition mode flag is set.

Initially, on power-up, the system proceeds to step 206 and samples the voltage at the GP I/O port 148 where the two (2) wires are connected during the first sample period. If a voltage is present, as determined in step 208, the system sets the current sample to its equivalent digital value by way of the analog to digital converter (ADC) on board the CPU 102 (FIG. 8) in step 210. Next in step 212, the system checks whether a previous sampled voltage exists. Assuming that this is the first sample period, the system proceeds to step 214 and sets the variable "Last Sample" to the digital value of the first sample in step 214. The system then returns to step 206 for a second sample period.

During the second sample period, the a second sample of the voltage is taken at the GP I/O port 148 (FIG. 8) where the two (2) wires are connected. If a voltage is present, as detected in step 208, the system sets the second sample to its digital equivalent in step 210. If a previous voltage sample exists, as determined in step 212, the system sets a voltage hysteresis mode flag in step 216. On the other hand, if a voltage is not present in either first or second sample period, as determined in step 208, the system assumes a hard ignition mode and sets a hard ignition mode flag is set in step 218.

Figure 10:
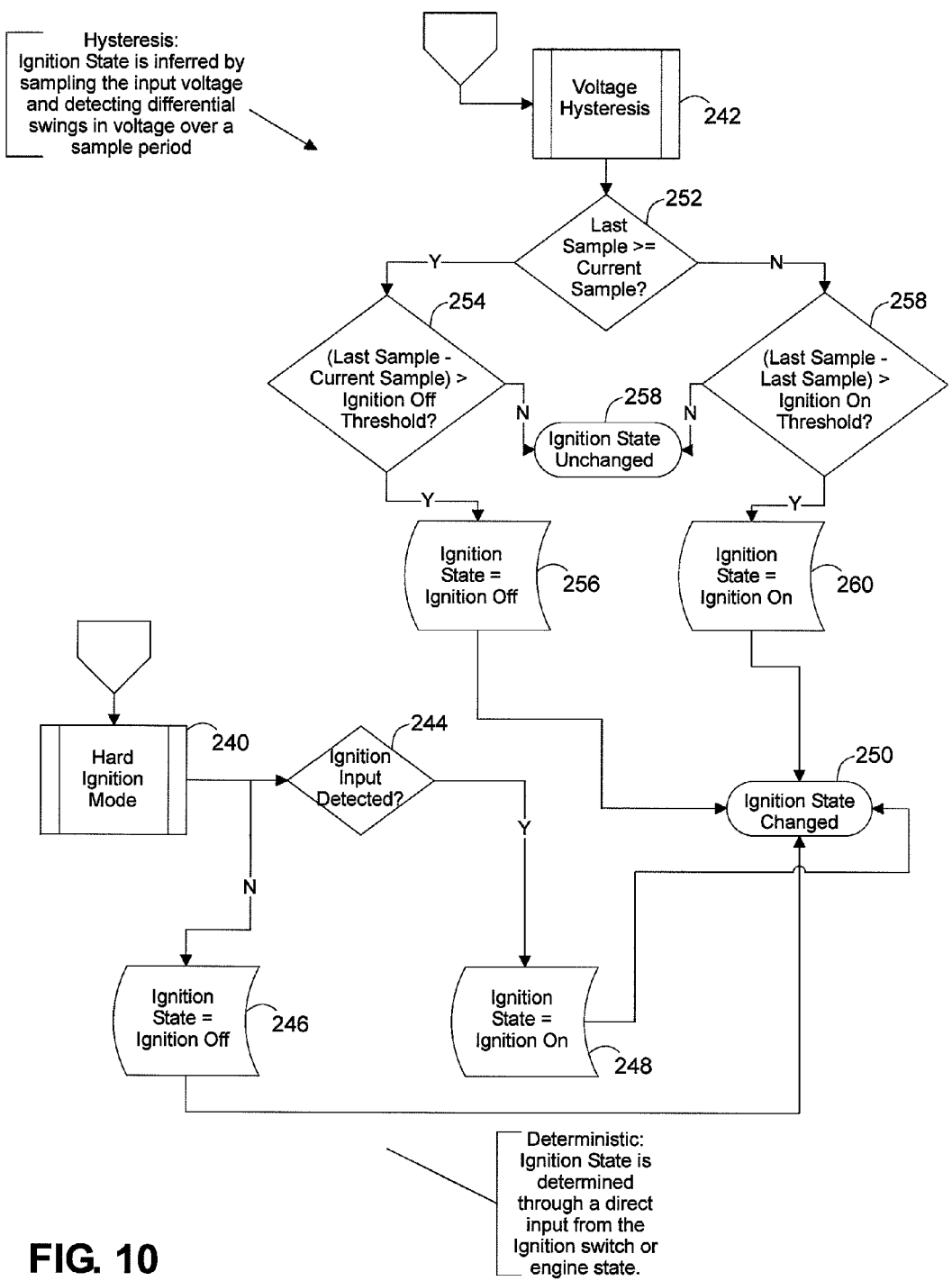
FIG. 10 is a software flow diagram for determining the state of the ignition system.

FIG. 10 is a software flow diagram for determining the state of the ignition system. Once the installation type is learned by the system, as discussed above, either a hard ignition mode flag 240 or a voltage hysteresis mode flag 242 is set. Assuming the hard ignition mode flag was set, the system continuously checks for changes to the ignition input status in step 244. As mentioned above, with a hard-wired ignition installation, the ignition status is either Ignition On or Ignition Off, as indicated by the logic blocks 246 and 248, respectively. Each time the ignition state changes, an ignition State Changed flag is set. In step in step 250.

On the other hand, if the voltage hysteresis mode flag 242 was set, the system monitors the voltage at the port where the two (2) wire ignition is connected and checks in step 252 whether the last sample voltage≤the current sample voltage. The system then checks whether the last sample voltage minus the current sample voltage>the ignition off threshold voltage, for example 0.5 volts DC, assuming a 12 volt system in which the battery voltage is 12.5 volts DC when the ignition is OFF and 12.0 volts DC when the ignition is ON, in step 254. If so, the system assumes the ignition state is Ignition Off in step 256. If not, the system assumes the ignition state changed in step 258.

As mentioned above, the system monitors the voltage at the port where the two (2) wire ignition is connected and checks in step 252 whether the last sample voltage the current sample voltage. If the last sampled voltage<the last sample voltage, the system proceeds to step 258 and determines whether last sample voltage minus the current sample voltage>the ignition on threshold voltage. If so, the system assumes the ignition state is Ignition On in step 260. If not, the system assumes the ignition state changed in step 258.

Figure 11:
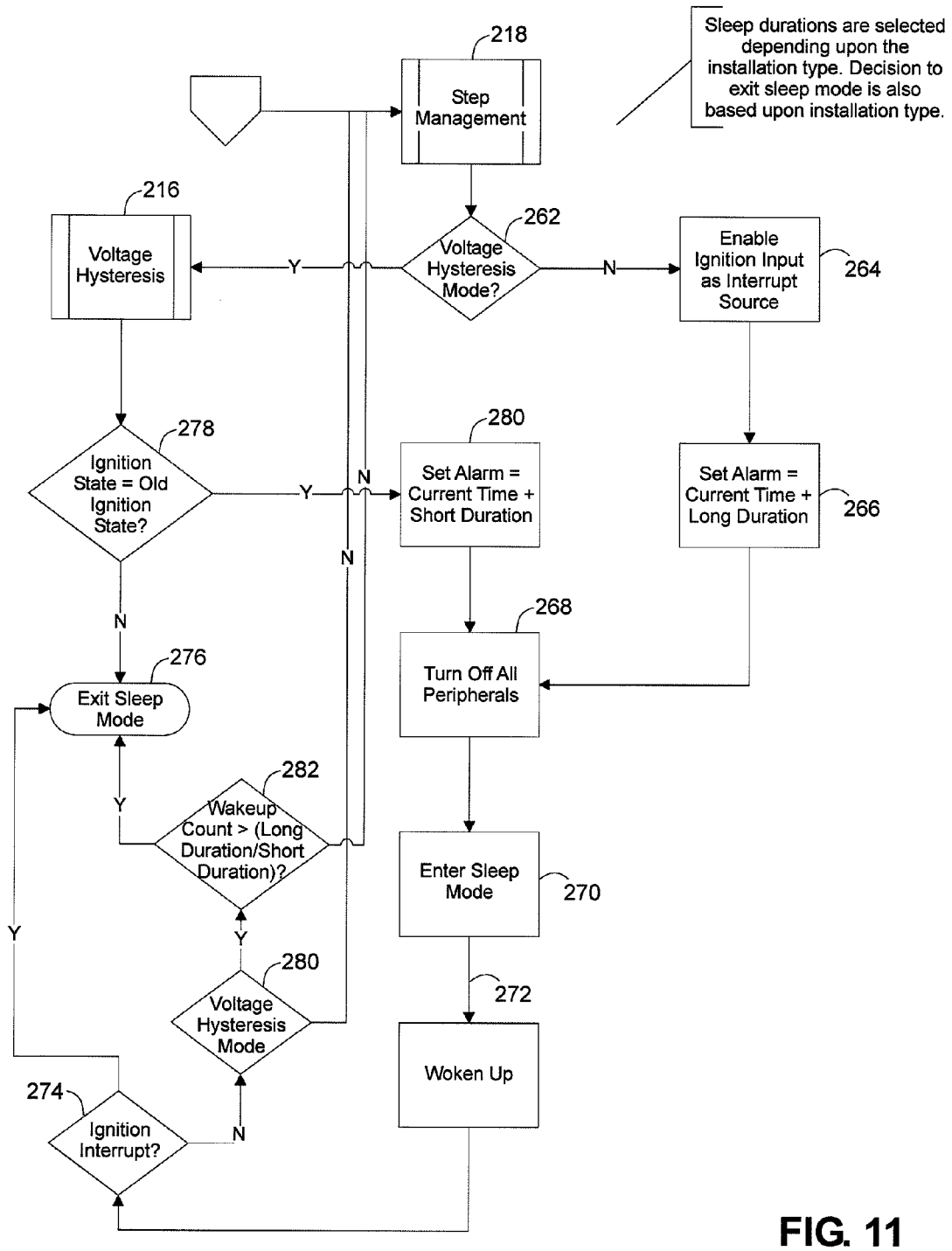
FIG. 11 is a software flow diagram for managing an ultra-low power sleep mode.

FIG. 11 is a software flow diagram for managing an ultra-low power sleep mode. In order to conserve power particularly for vehicles with relatively small batteries, the system includes a sleep management mode. The sleep management mode is used when there is minimal activity with respect to the state of the ignition system. Depending on the installation type, different sleep durations may be used. Thus, in step 262, the system determines whether the voltage hysteresis mode flag was set. If not, the system assumes a hard wired mode and enables the ignition input as an interrupt source in step 264. Thus, any changes in the ignition state will interrupt the sleep mode and wake up the asset recovery system 100. In step 266, an alarm is set for the current time plus a relatively long duration, for example, 3 minutes. After the alarm is set, all peripherals are turned off in step 268. These peripherals may include LEDs within the vehicle. The GPS subsystem 114 may also be placed in a hibernation mode. The system then enters the sleep mode 270; a relatively low power mode The system remains in the sleep mode until woken up, as indicated by the logic block 272, by way of an ignition interrupt, as indicated in step 274. The system exits the sleep mode in step 276. Otherwise the system remains in the sleep mode.

On the other hand, if the system determines in step 262, that the voltage hysteresis flag 216 is set, the system checks in 278 whether the current ignition state is the same as the old ignition state. If not, the system exits the sleep mode in step 276. In other words, if the system is in the voltage hysteresis mode, any change in the ignition state causes the system to exit the sleep mode. If the ignition state has not changed, an alarm is set in step 280 for the current time plus a relatively short duration, for example, 30 seconds. At the expiration of the time period, the system proceeds to step 268 and turns off all peripherals and enters the sleep mode in step 270. The system may then woken up by interrupt or in a predetermined time interval. In particular, if the voltage hysteresis mode flag was set, as determined in step, the system checks in step 282 whether a predetermined time interval has elapsed, for example, whether a time interval, identified as the "wakeup count" has expired where the wakeup count>long duration/short duration. If so, the system exits the sleep mode. Otherwise, the system stays in the sleep mode.

Figure 12:
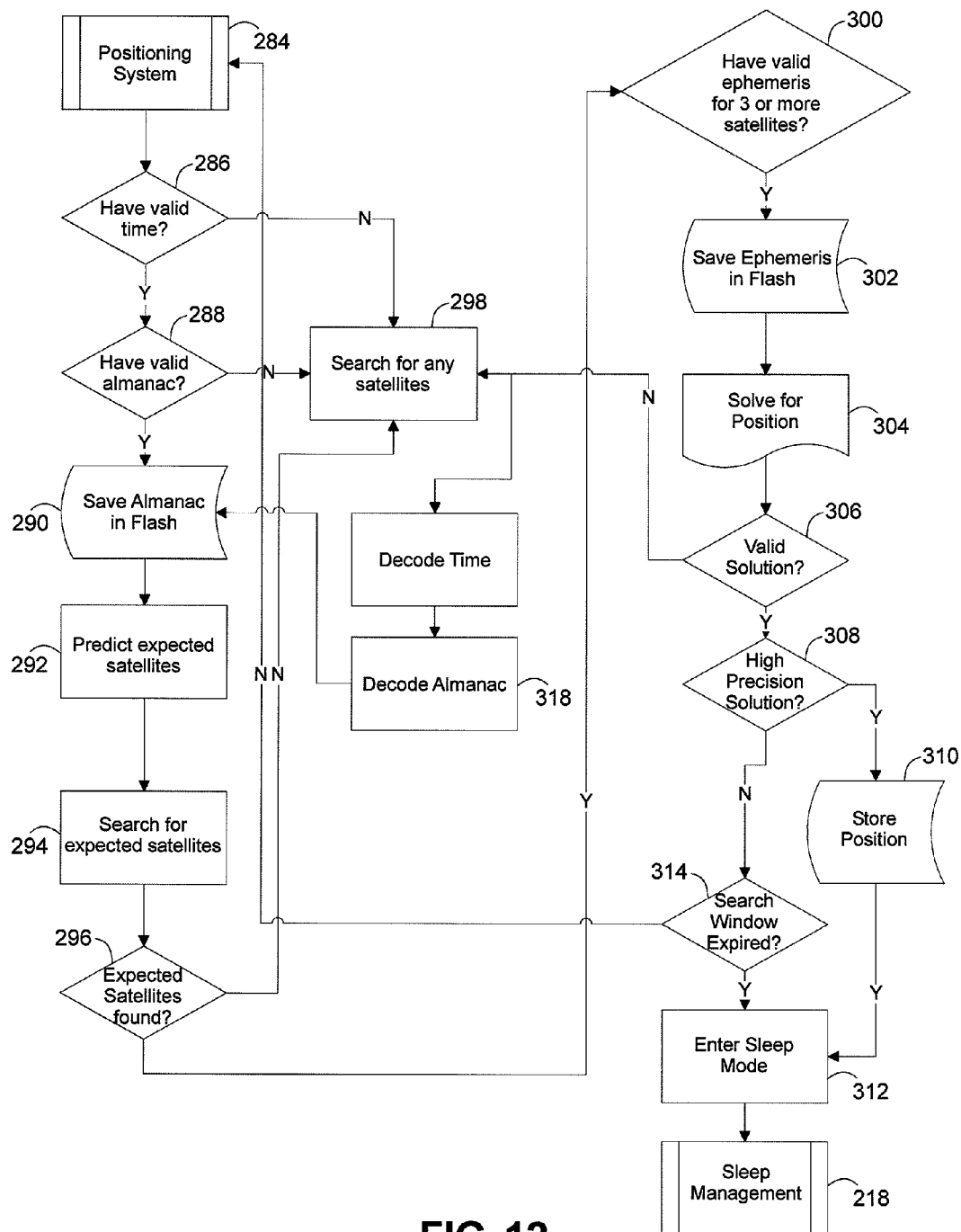
FIG. 12 is a software flow diagram illustrating the GPS position calculation.

FIG. 12 is an exemplary software flow diagram illustrating the GPS position calculation. The GPS system is used to determine the position of the vehicle. GPS satellites broadcast two types of data: Almanac data and Ephemeris data. Almanac data relates to course orbital parameter data for all of the GPS satellites in the constellation. Each satellite broadcasts Almanac data for all of the satellites in the constellation. Almanac data is not considered to be very precise and is considered valid only for a few months. Ephemeris data by comparison is very precise orbital and clock correction for each satellite and is necessary for precise positioning. Each satellite broadcasts only its own Ephemeris data. This data is only considered valid for about 30 minutes. The Ephemeris data is broadcast by each satellite every 30 seconds. When the GPS is initially turned on after being off for more than 30 minutes, it "looks" for the satellites based on where it is based on the almanac and current time. With this information, appropriate satellites can be selected for initial search[3].

[3] "Almanac and Ephemeris Data as used by GPS receivers", by Joe Mehaffey, (Jul. 4, 1998), http://gpsinformation.net/main/almanac.txt Based on the above, the system checks in steps 286 whether it has the current time. As mentioned above, the CPU 102 (FIG. 8) includes a real time clock 132, which can be used for the current time. The GPS Receiver 114 receives Almanac data directly from the satellites, as mentioned above. The Almanac data is saved in Flash memory 106 in step 290. Based on the real time and the almanac data, the system predicts expected satellites in step 292 and searches for those satellites in step 294. In step 296, the system checks whether the expected satellites were found. If either there is no real time data; no valid Almanac data or the expected satellites cannot be found, the system searches for any satellites in step 298.

If the expected satellites are found, as determined in step 296, the system checks in step 300 whether valid ephemeris data has been found for three (3) or more satellites. If so, the system saves the ephemeris data is found, it is stored in the Flash memory 106 (FIG. 8) in step 302. In step 304, the vehicle position is triangulated based on the ephemeris data. The system then checks in step 306 whether the position is valid by comparing it with the last known position of the vehicle. If the position is not determined to be valid, real time and almanac data is decoded in steps 316 and 318 from the satellite signals located in step 298. The decoded almanac data is then stored in the flash memory 106 (FIG. 8) and the system proceeds to calculate the vehicle position as indicated in steps 292-304, as discussed above.

If the position is determined to be valid, the system next checks in step 308 whether the solution is a high precision solution in step 308), for example, as provided by the GPS chip set mentioned above. If so, the position is stored in step 310 and the system enters the sleep mode in step 312 for duration as determined by the sleep management mode 218 (FIG. 11).

On the other hand, if the position is not considered to be a high precision solution, as determined in step 308, the system checks whether the search window has expired in step 314. If not, the system returns to step 284. If so, the system enters the sleep mode.

Figure 13:
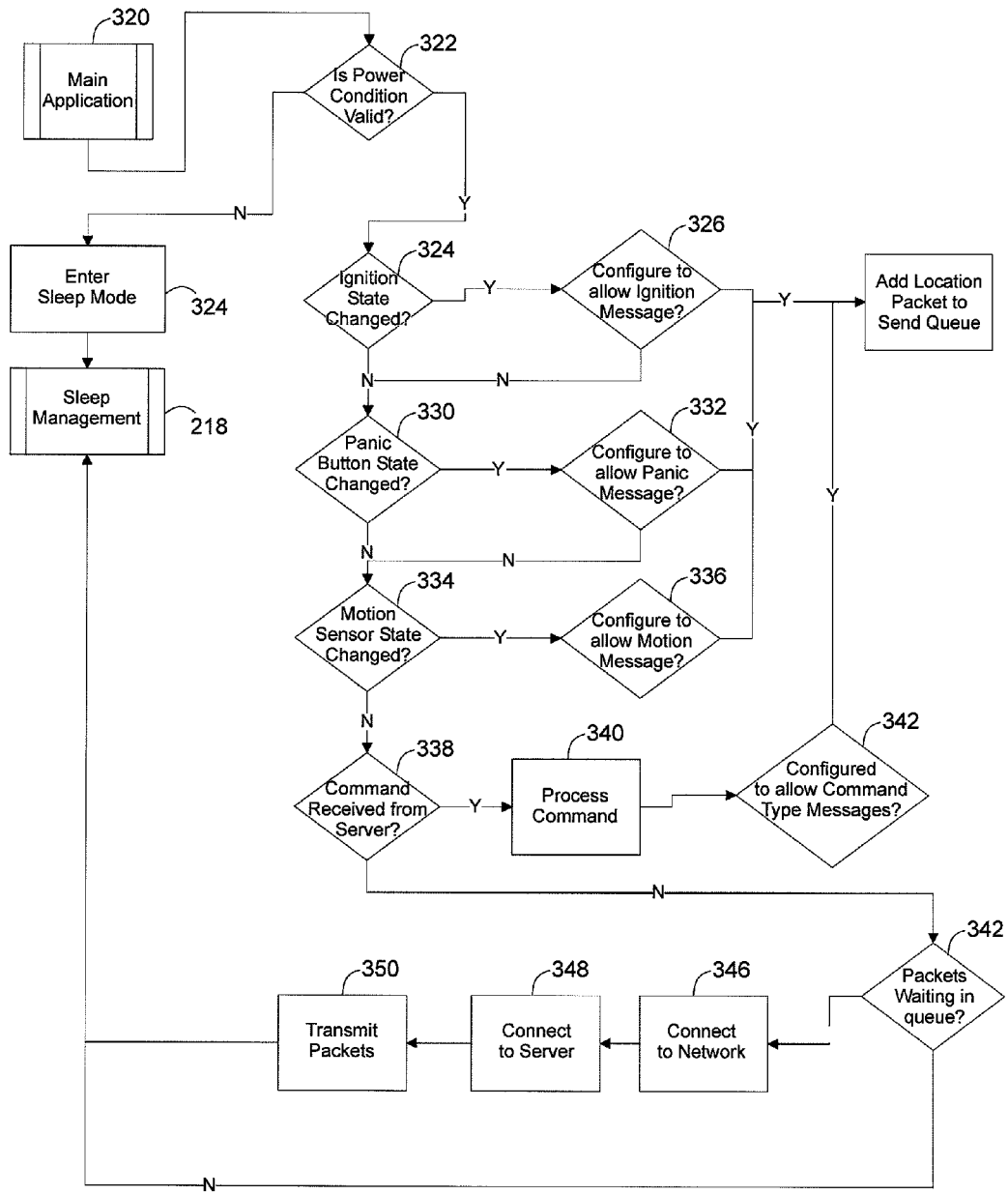
FIG. 13 is a software flow diagram of the main application state machine.
Figure 14:
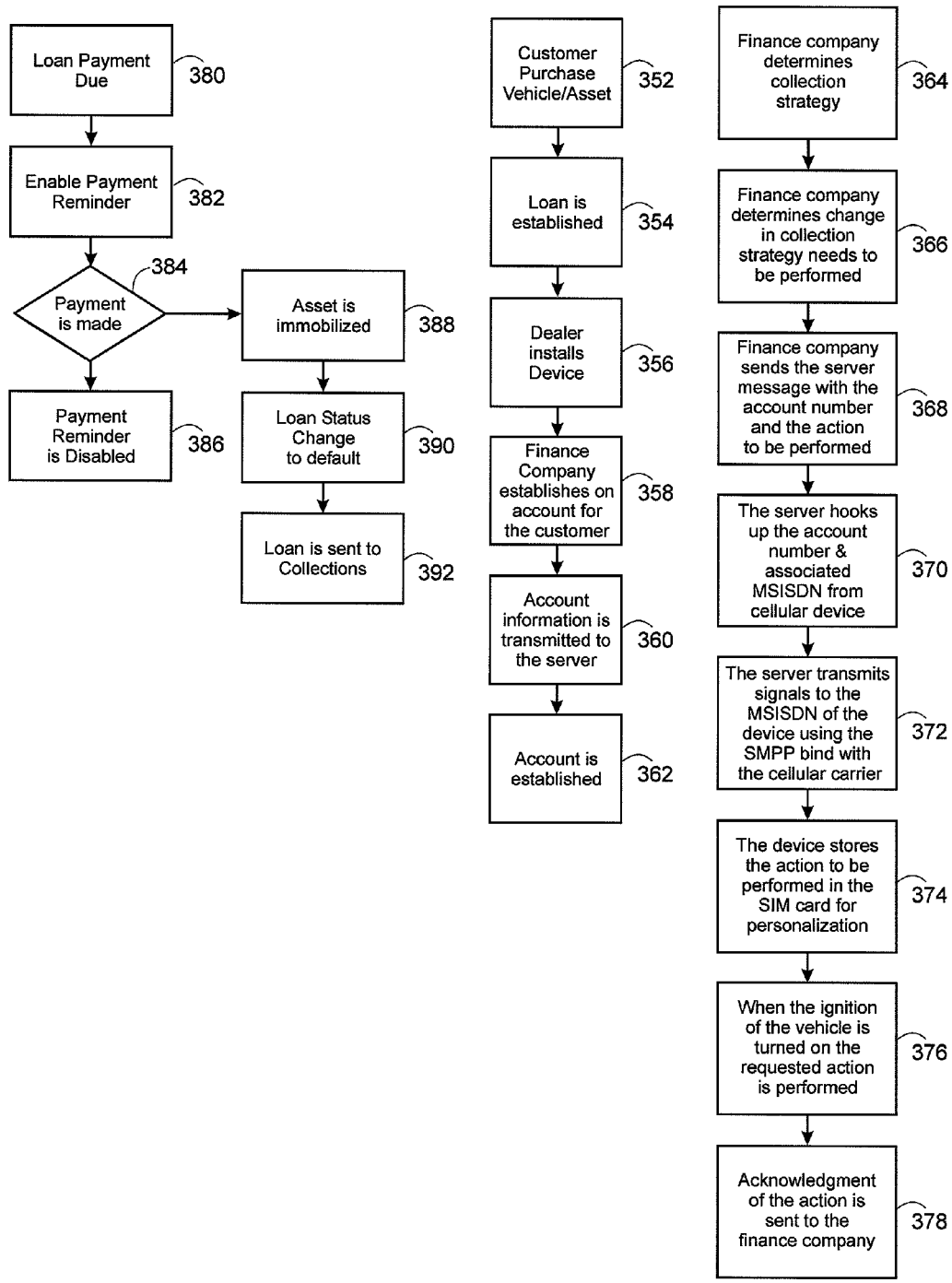
FIG. 14 is a software flow diagram of the loan obligation management system in accordance with one aspect of the present invention.

The main state machine, generally identified with the reference numeral 320, is illustrated in FIG. 13. As used herein, the system is configured as a master server network. The asset recovery system 100 is the client which communicates with a remote server (not shown). Initially the power condition of the asset recovery system is checked, for example, by measuring its power input in step 322. If the power condition is not valid, the system proceeds to step 324 and enters the sleep mode for a duration as determined by the sleep management system 218.

If the power condition is valid, the system checks its inputs. Specifically, the system checks in step 324 whether the ignition state has changed. If so, the system checks in step 326 whether the asset recovery system 100 is configured to allow ignition messages to be sent to the server. In particular, on power-up, the asset recovery system 100 fetches its configuration from a remote server. The system 100 then stores its configuration and sets a flag at the server If the asset recovery system 100 is properly configured, the system adds a location packet to the ignition message so that the ignition message can be correlated to the vehicle position in step 328. In step 330, the system checks whether the state of the panic button has changed. If so, the system checks in step 332 whether the asset recovery system 100 is configured to allow panic messages to be sent to the server. If so, the system adds a location packet to the panic message so that the change of state of the panic button can be correlated to the vehicle position in step 328. In step 334, the system checks whether the state of the motion sensor has changed. If so, the system checks in step 336 whether the asset recovery system 100 is configured to allow motion messages to be sent to the server. If so, the system adds a location packet to the panic message so that the change of state of the motion sensor can be correlated to the vehicle position in step 328.

In step 338, the system checks whether any commands have been received from the server (not shown). If so, the system processes the command in step 340. Exemplary commands may include signals to sound the vehicle horn; disable the vehicle starter; or illuminate an LED in the vehicle. In step 342, the system checks whether the asset recovery system is configured to allow command type messages. If so, the system proceeds to step 328.

If there are no commands from the server, the system checks in step 344 to determine whether there are packets in the queue ready to be sent to the server over the cellular network. If so, the system is connected to the network in step 346 and connects with the server in step in step 348. In step 350, the system transmits the packets to the server.

Loan Obligation Management System

FIG. 14 is a software flow diagram of the loan obligation management system in accordance with one aspect of the present invention. In this embodiment of the invention, the asset recovery system 100 is provided with additional functionality. In this embodiment of the invention, the finance company involved with the financing of the vehicle uses the asset recovery system 100 for loan obligation management. In particular, assuming a customer purchases a vehicle or other asset as indicated in step 352 and establishes a loan for purchase of the vehicle in step 354. As part of the loan conditions, an asset recovery system 100 is installed in the vehicle in step 356. In step 358 an account number for the loan is established and transmitted to the system server in step 360, thereby establishing the account on the server.

In this system the finance company determines a collection strategy, as indicated by the logic block 364. Based upon changes in the payment history by the debtor, the finance company may determine a that a change in the collection strategy needs to be performed, as indicated by the logic block 366 and sends the server a message with the account number and the action that needs to be taken in step 368. Upon receipt of the message from the finance company, the server looks up the account number and the associated MSISDN number of the cellular device within the asset recovery system 100 in the vehicle in step 370 and transmits the message in step 372. The message is stored as a command in the SIM card 172 (FIG. 8). In step 376, the system performs the command when the ignition is turned on. In step 378, the system acknowledges to the finance company that that the requested action has been taken.

An exemplary embodiment of the loan obligation management system may include management through an entire payment cycle. In particular, assuming that a loan payment is due, as indicated by the logic block 380, a payment reminder is enabled in the vehicle. The payment reminder may be illumination of an LED in the vehicle. If the payment is made, as indicated in step 384, the payment reminder is disabled in step 386. However, if payment is not made, the vehicle is disabled, for example, by disabling the starter in step 388. In that situation, the loan status would be considered to be in default and sent to collections, as indicated by the logic blocks 390 and 392.

Obviously, many modifications and variations of the present invention are possible in light of the above teachings. Thus, it is to be understood that, within the scope of the appended claims, the invention may be practiced otherwise than as specifically described above.

We claim:

1. A method for determining the ignition state of a vehicle without monitoring the state of an ignition switch, the method comprising the steps of:
   (a) measuring a voltage across a primary winding of a vehicle ignition coil during a first sample period by way of a central processing unit (CPU) connected to said primary winding by way of a port, defining a first sample voltage;
   (b) storing said first sample voltage in memory associated with said CPU;
   (c) measuring the voltage of the primary winding of the vehicle ignition coil during a second sample period by way of a CPU connected to said primary winding by way of a port, defining a second sample voltage;
   (d) storing said second sample voltage in memory associated with said CPU;
   (e) comparing by way of said CPU said first sample voltage and said second sample voltage defining a comparison; and
   (f) providing an indication by way of said CPU of said ignition state as a function of said comparison.

2. The method as recited in claim 1, wherein step (f) includes determining whether the first sample voltage is greater than or equal to said second sample voltage.

3. The method as recited in claim 2, wherein step (f) includes providing an indication of an ignition state as a function of whether said first sample voltage is greater than or equal to said second sample voltage.

4. The method as recited in claim 3, wherein step (f) includes providing an indication of an Ignition Off State when the difference between said first sample voltage and said second sample voltage is greater than a predetermined value.

5. The method as recited in claim 3, wherein step (f) includes providing an indication of an Ignition State Unchanged when the difference between said first sample voltage and said second sample voltage is not greater than a predetermined value.

6. The method as recited in claim 3, wherein step (f) includes providing an indication of an Ignition On State when the difference between said second sample voltage and said first sample voltage is greater than a predetermined value.

7. The method as recited in claim 3, wherein step (f) includes providing an indication of an Ignition State Unchanged when the difference between said second sample voltage and said first sample voltage is not greater than a predetermined value.

* * * * *